United States Patent

Alff

[11] Patent Number: 5,640,087
[45] Date of Patent: Jun. 17, 1997

[54] DEVICE FOR DETECTION OF THE SPEED OF ROTATION OF A ROLLING BEARING

[75] Inventor: Denis Alff, Annecy, France

[73] Assignee: The Torrington Company, Torrington, Conn.

[21] Appl. No.: 643,493

[22] Filed: May 6, 1996

Related U.S. Application Data

[63] Continuation of Ser. No. 332,177, Oct. 31, 1994, abandoned.

[30] Foreign Application Priority Data

Mar. 8, 1994 [FR] France .................. 94 02626

[51] Int. Cl.$^6$ .................. G01P 3/481; F16C 41/04
[52] U.S. Cl. .................. 324/173; 384/448
[58] Field of Search .................. 384/446, 448; 324/207.25, 173, 174, 262

[56] References Cited

U.S. PATENT DOCUMENTS

| | | | |
|---|---|---|---|
| 4,783,180 | 11/1988 | Hayashi | 384/448 |
| 5,143,458 | 9/1992 | Alff et al. | 384/448 |
| 5,192,138 | 3/1993 | Fay et al. | 384/448 |
| 5,287,738 | 2/1994 | Polinsky et al. | 384/448 |
| 5,296,805 | 3/1994 | Clark et al. | 384/448 |
| 5,310,266 | 5/1994 | Coux et al. | 384/448 |
| 5,451,869 | 9/1995 | Alff | 324/173 |

FOREIGN PATENT DOCUMENTS

| | | |
|---|---|---|
| A-0092605 | 11/1983 | European Pat. Off. . |
| A-2669736 | 5/1992 | France . |
| A-2693272 | 8/1994 | France . |
| A-3041334 | 6/1982 | Germany . |

*Primary Examiner*—Sandra L. O'Shea
*Assistant Examiner*—Roger C. Phillips
*Attorney, Agent, or Firm*—John C. Bigler

[57] ABSTRACT

A device for detection of the speed of rotation of a rolling bearing which has an encoder element mounted on the rotating part of the bearing and a sensor unit consisting of a sensor holder attached to a support mounted in contact with a nonrotating part of the bearing. The sensor unit is mounted on an elastic member for positioning with respect to the encoder element and may be adjusted with respect to a removable immobilization component of the sensor unit in contact with the support.

12 Claims, 4 Drawing Sheets

DEVICE FOR DETECTION OF THE SPEED OF ROTATION OF A ROLLING BEARING

This application is a continuation of application Ser. No. 08/332,177, filed Oct. 31, 1994, now abandoned.

BACKGROUND OF THE INVENTION

This invention relates generally to a device for detection of the speed of rotation of a rolling bearing which has an encoder mounted on the rotating part of the bearing and a sensor unit consisting of a sensor holder attached to a support for positioning of the sensor unit mounted in contact with the nonrotating part of the bearing.

French Patent No. 2,667,947 A describes a device in which an annular sensor holder is immobilized between the stationary ring of a rolling element and a shoulder of the positioning support. The angular displacements of the sensor holder following the stray axial movements of the rolling element in its housing induce erroneous information and premature deterioration of the electrical connections.

French Patent No. 2,693,272 A describes a device in which the metallic support of the sensor unit has a roughly axial centering seat in contact with a bearing surface arranged on the nonrotating part of the bearing. For the purpose of increasing the precision of mounting of the sensor unit, a known method is to immobilize the metallic support of the sensor unit between a nonrotating radial surface of the bearing and an adjacent radial surface. The replacement of the sensor holder requires the rolling element to be disassembled beforehand.

In such devices, the correct mounting of the sensor unit requires one to comply with a large number of manufacturing tolerances which must be even more precise as the encoder element becomes smaller and its magnetic field weaker. The annular configuration leads, during its possible disassembly, to the complete removal of the rotating assembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a device for detection of the speed of rotation of a rolling bearing comprising an encoder element mounted on a rotating part of the bearing and a sensor unit. The sensor unit comprises a sensor holder on a support mounted in contact with a nonrotating part of the bearing and is mounted on an elastic member for positioning with respect to the encoder element. The sensor unit has means for adjustment with respect to a removable immobilization component of said sensor unit in contact with the support.

The foregoing and other aspects will become apparent from the following detailed description of the invention when considered in conjunction with the accompanying drawing figures.

BRIEF DESCRIPTION OF THE DRAWING FIGURES

Figure 1:
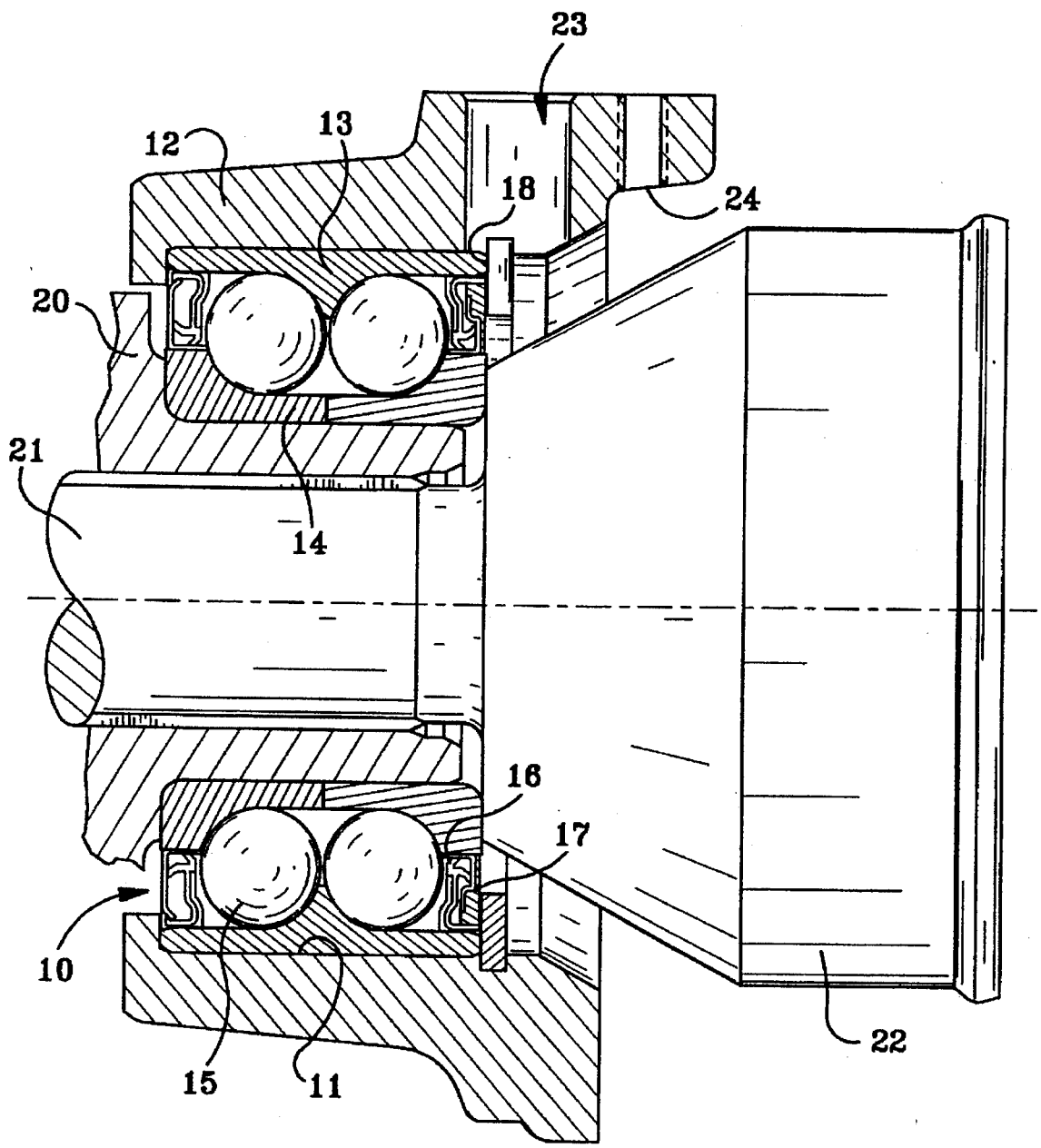
FIG. 1 is an axial section of rolling bearing equipped with a sensor unit support according to the present invention, as would be applied to a drive wheel of a motor vehicle.
Figure 2:
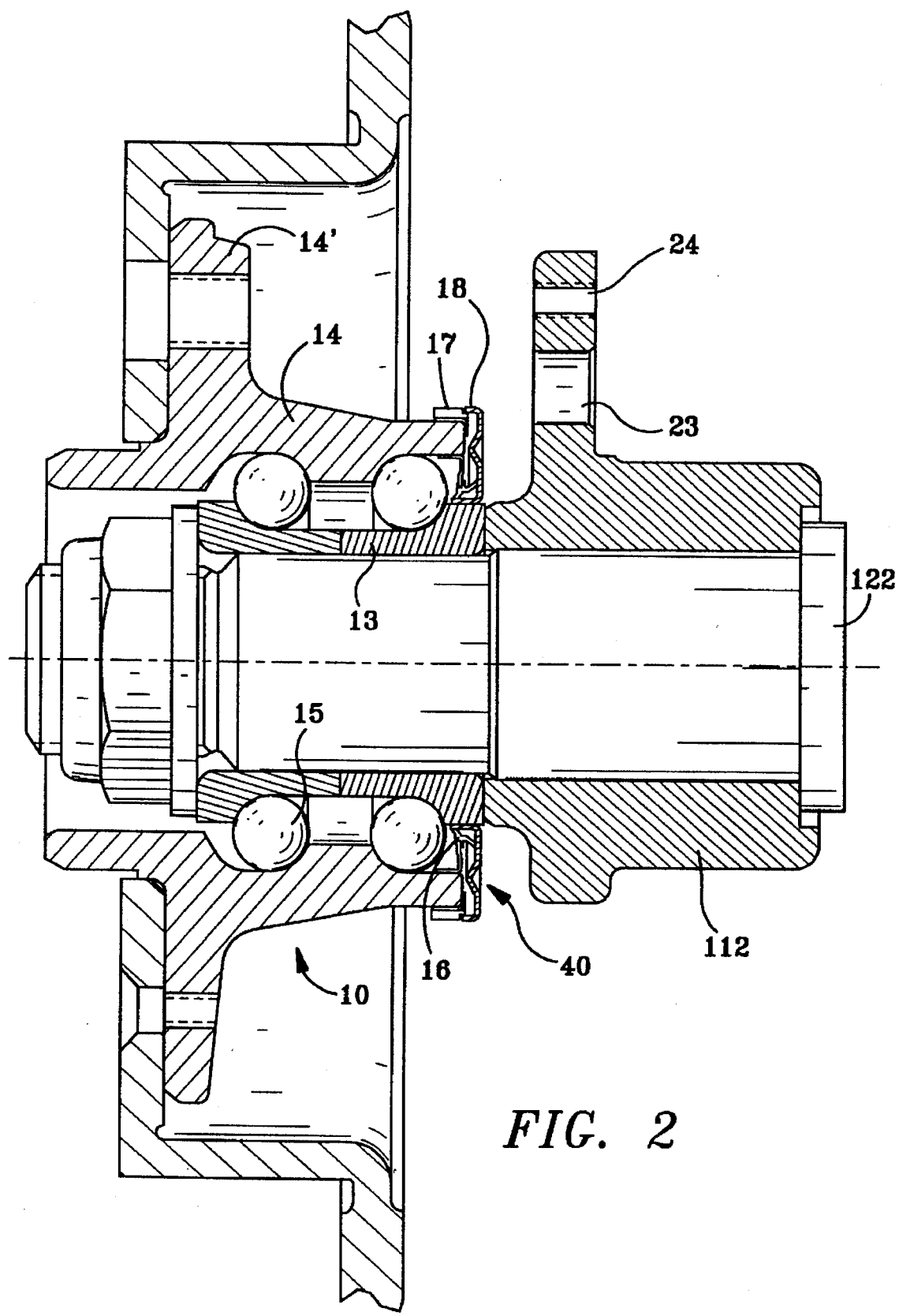
FIG. 2 is an axial section of an alternative embodiment of rolling bearing equipped with a sensor unit support according to the present invention, as would be applied to a nondrive wheel of a motor vehicle.
Figure 3:
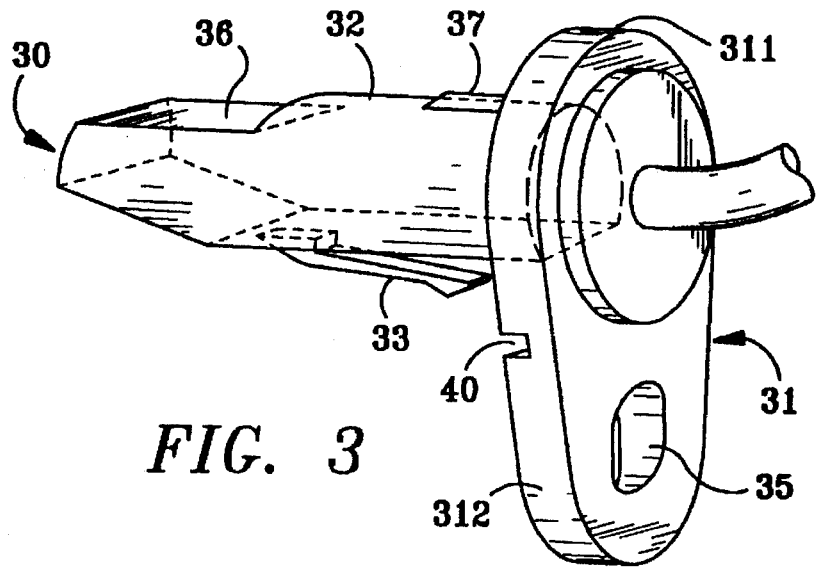
Figure 4:
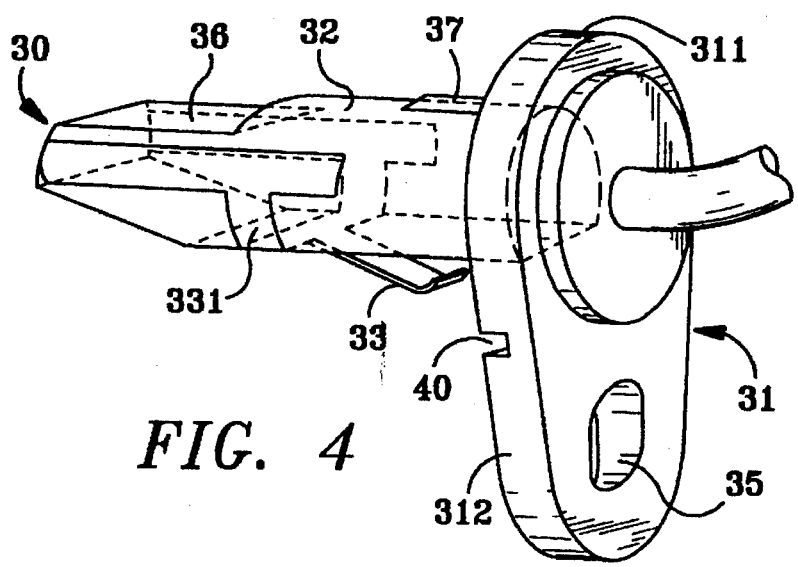
Figure 5:
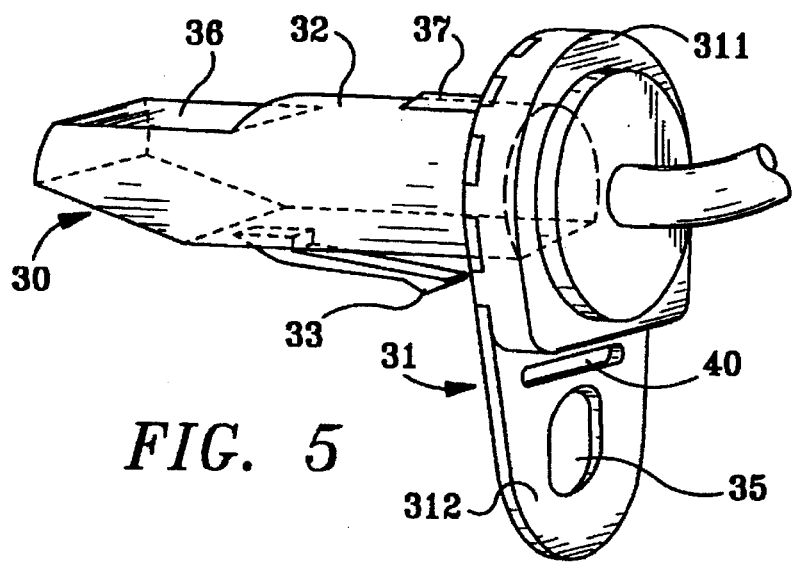
Figure 6:
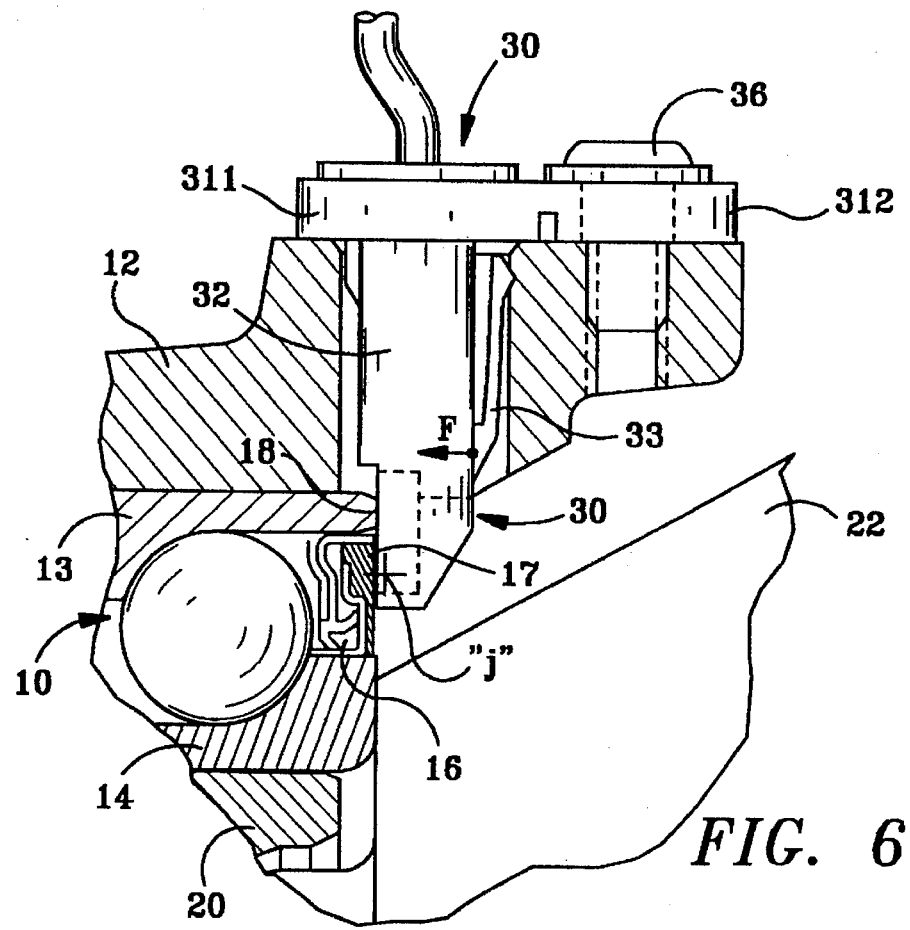
Figure 7:
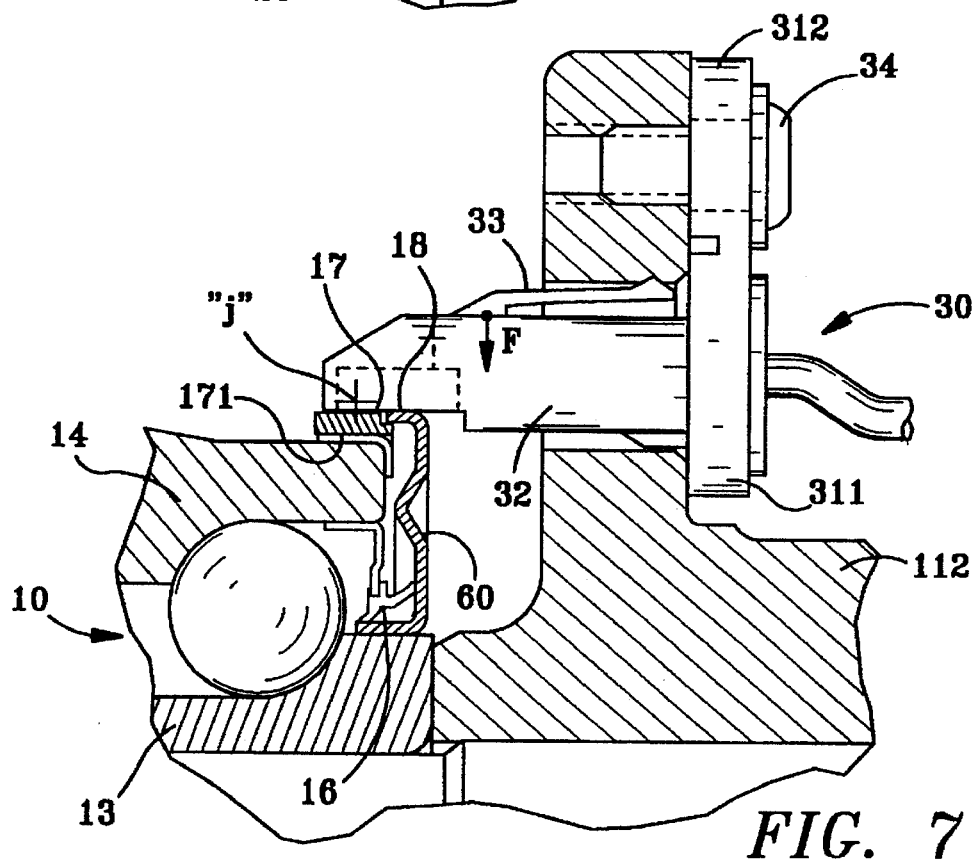

FIGS. 3, 4, and 5 are oblique views of various embodiments of the sensor unit according to the present invention; and FIGS. 6 and 7 are sectional views of portions of the bearing represented in FIGS. 1 and 2 and equipped with a sensor unit according to FIG. 3.

In order to simplify the description, the same reference numerals are used to identify the components of the rolling bearing respectively represented in FIGS. 1 and 2 which perform the same function.

DETAILED DESCRIPTION

Referring now to the drawings, FIG. 1 illustrates rolling bearing 10 held by a ring in bore 11 in stationary spindle holder 12 which thus constitutes, as discussed below, the support for positioning sensor unit 30.

In a conventional manner, rolling bearing 10 has outer stationary ring 13, inner rotating ring 14 in two parts, rolling bodies 15 arranged between said rings, and seal 16. Seal 16, as described in the French Patent Application No. 9,300,458 A filed in the name of the applicant, has an incorporated encoder element 17 mounted on rotating ring 14 and can be positioned with precision with respect to the lateral surface of stationary ring 13. Inner ring 14 is immobilized on rotating hub 20 on which the disk for braking the wheel is mounted. Hub 20 also has internal driving grooves mounted on shaft 21 of driven element 22 of a universal joint. Spindle holder 12 provides a housing for the sensor unit comprising radial hole 23 for mounting sensor unit 30 and threaded hole 24 for receiving screw 34 for immobilization of said sensor unit 30.

The bearing represented in FIG. 2 consists of rolling bearing 10 immobilized axially on stationary axle 122. In a conventional manner, rolling bearing 10 has inner stationary ring 13 in two parts and is axially immobilized by an adjusting nut, against the lateral surface of stationary support 112 of sensor unit 30. To this effect, support 112 provides a housing comprising axial hole 23 for mounting sensor unit 30 and threaded hole 24 for receiving screw 34 for immobilization of sensor unit. Outer rotating ring 14 forms one piece, by means of its attachment band 14', with a disk for braking a nondrive wheel, and has seal 16 in contact with ring 13. Encoder element 17 is associated with reinforcement on the cylindrical axial end of ring 14.

As represented in FIG. 3, sensor unit 30 has adjustment and attachment band 31 and body 32. This construction arrangement is completed by the oblong arrangement of hole 35 of band 31 intended for receiving screw 34. Body 32 has a reduced section with respect to that of mounting opening 23 so as to provide play for axial (FIG. 6) or radial (FIG. 7) regulation and adjustment of the band with respect to encoder element 17. To this effect, body 32 has elastic support tongue 33 in contact with the wall of mounting opening 23 for the purpose of pushing body 32 back near encoder element 17. Detection surface 36 opposite tongue 33 facilitates the correct positioning of the sensor unit in the direction of the desired regulation.

When body 32 is positioned in mounting hole 23 as indicated in FIG. 6, support tongue 33 is compressed against the wall of the hole and transmits to body 32 a reaction force oriented perpendicularly to detection surface 36. Body 32 is then positioned at detection surface 36 in contact with the lateral surface of stationary ring 13. Stop support 18 in contact with said lateral surface also allows for the establishment of the functional play "J" between encoder element 17 and detection surface 36.

According to another characteristic of the device, functional play "J" is also preserved following accidental axial displacement of rolling element 10 in its housing. In this case, tongue 33 transmits force F oriented perpendicularly to surface 36 of body 32, which ensures the continual contact between surface 36 and stop support 18. Such a displacement generates partial bending of band 31. Band 31 is consequently divided in sections and has head 311 of sensor unit 30 and attachment and support tab 312 in contact with corresponding support 12 (FIG. 6) or 112 (FIG. 7) bearing hole 35. Head 311 and attachment tab 312 are separated by a zone of bending made clear in FIG. 3 or 4, for example, by groove 40 which allows relative displacement of head 311 with respect to attachment tab 312 by reducing the rigidity of band 31.

According to FIG. 3, sensor unit 30 is a molded element which integrates the functions of adjustment and attachment performed by tongue 33 and band 30. According to FIG. 4, sensor unit 30 bears an elastic support tongue 33 connected to head 311 that encloses body 32 of the sensor unit. According to FIG. 5, sensor unit 30 has a connected attachment band 31 made of flexible sheet steel, in part forming one piece with the plastic element constituting the sensor unit.

In the mounting example represented in FIG. 7, displacements of sensor unit 30 could be limited in hole 23 of support 112 by additional stop 37 carried by body 32, that limits the displacements of body 32 in hole 23 under the effect of the force communicated by tongue 33. Deflector 40 is mounted on interior stationary ring 13 in contact with seal 16. Deflector 40 extends radially toward body 32 and constitutes radial stop support 18 of said body 32, that is necessary for preservation of functional play "j." Detection surface 36 of sensor unit 30 is oriented towards encoder element 17 carried by annular support 171 mounted exteriorly at the end of exterior ring 14, opposite its attachment band 14'.

Having described the invention, what is claimed is:

1. A device for detection of the speed of rotation of a rolling bearing having a rotating ring and a stationary ring, the device comprising:

an encoder element carried by the rotating ring of the rolling bearing; and a sensor unit mounted on a stationary support connected to the stationary ring of the rolling bearing, the sensor unit having a detection surface and comprising a sensor holder and a biasing means for biasing the sensor holder against a stop surface for positioning with respect to the encoder element by exerting a force (F) upon the sensor unit, the force (F) being perpendicular to the detection surface of the sensor unit, the sensor holder being roughly cylindrical and the biasing means comprising an elastic support tongue diametrically opposite the detection surface of the sensor unit and integrated in the sensor unit.

2. The device according to claim 1, wherein the stop surface comprises a lateral surface of the stationary ring of the rolling bearing.

3. The device according to claim 1, wherein the stop surface comprises a radial extension of a deflector element of a seal connected to the stationary ring of the rolling bearing.

4. The device according to claim 1, wherein the sensor unit includes a stop member carried by the sensor holder for limitation of the displacement of the sensor unit with respect to the stationary support.

5. The device according to claim 1, wherein the sensor unit includes a detection surface oriented towards the encoder element, and the encoder element is mounted on an annular support mounted exteriorly on the rotating ring of the rolling bearing.

6. The device according to claim 1, further comprising adjustment means for adjustably locating the sensor unit with respect to an immobilization component in contact with the stationary support.

7. The device according to claim 6, wherein the adjustment means of the sensor unit comprises an attachment band in contact with the immobilization component.

8. The device according to claim 7, wherein the attachment band is integrally connected with the sensor unit so as to form one piece with it.

9. The device according to claim 1, wherein the adjustment means provides selective axial positioning of the sensor unit toward and away from the encoder element.

10. The device according to claim 1, wherein the adjustment means provides selective radial positioning of the sensor unit toward and away from the encoder element.

11. The device according to claim 1, wherein the sensor unit further comprises a collar connected to the roughly cylindrical sensor holder so as to form one piece.

12. A device for detection of the speed of rotation of a rolling bearing comprising:

an encoder element mounted on a rotating part of the bearing; and a sensor unit comprising a sensor bolder and an elastic member, the sensor unit being mounted on a stationary support, the elastic member exerting a force upon the sensor holder perpendicular to a detection surface of the sensor unit in contact with a stop support for positioning the sensor unit with respect to the encoder element, the sensor unit having an attachment member for attachment with respect to a removable immobilization component in contact with the stationary support, the sensor bolder being roughly cylindrical and the elastic member comprising an elastic support tongue diametrically opposite the detection surface of the sensor unit and integrated in the sensor unit, the removable immobilization component being separated from the sensor holder by a bending zone of the attachment member that allows for relative displacement of the sensor holder with respect to the removable immobilization component.

* * * * *